US008161460B2

(12) United States Patent
Drumm et al.

(10) Patent No.: US 8,161,460 B2
(45) Date of Patent: Apr. 17, 2012

(54) SYSTEM AND METHOD OF AUTOMATIC INTEROPERABILITY CHECKING FOR BPEL

(75) Inventors: Christian Drumm, Karlsruhe (DE); Nadeem Qutteineh, Karlsruhe (DE); Ingo Weber, Mannheim (DE)

(73) Assignee: SAP AG, Walldorf (DE)

( * ) Notice: Subject to any disclaimer, the term of this patent is extended or adjusted under 35 U.S.C. 154(b) by 1357 days.

(21) Appl. No.: 11/809,017

(22) Filed: May 30, 2007

(65) Prior Publication Data

US 2008/0300838 A1 Dec. 4, 2008

(51) Int. Cl.
G06F 9/44 (2006.01)
(52) U.S. Cl. ........ 717/126; 717/124; 717/128; 719/328; 719/330
(58) Field of Classification Search .................... 717/126
See application file for complete search history.

(56) References Cited

U.S. PATENT DOCUMENTS 6,385,765 B1 * 5/2002 Cleaveland et al. .......... 717/100
7,536,606 B2 * 5/2009 Andrews et al. ................ 714/43

OTHER PUBLICATIONS

Seog-Chan Oh, Dongwon Lee, and Soundar Kumara. 2005. MISQ: a UML-based analytical modeling methodology for optimizing web service composition. In Proceedings of the IEEE EEE05 international workshop on Business services networks (BSN '05). IEEE Press, Piscataway, NJ, USA, 3-3.*
Naonobu Okazaki, Mi Rang Park, Kaoru Takahashi, and Norio Shiratori. 1995. A new test sequence generation method for interoperability testing. In 7th IFIP WG 6.1 international workshop on Protocol test systems (IWPTS '94), Tadanori Mizuno, Teruo Higashino, and Norio Shiratori (Eds.). Chapman \& Hall, Ltd., London, UK, UK, 243-258.*

Tony Andrews, Francisco Burbera, Hitesh Dholakia, Yaron Goland, Jo-Hannes Klein, Frank Leymann, Kevin Liu, Dieter Roller, Doug Smith, Satish Thatte, Ivana Trickovic, and Sanjiva Weerawarana. Business Process Execution Language for Web Services. OASIS Org., 2003. http://www-106.ibm.com/developerworks/webservices/library/ws-bpel/.
Niels Lohmann, Peter Massuthe, Christian Stahl, and Daniela Weinberg. Analyzing Interacting BPEL Processes. 2006.
Chris Peltz. Web Services Orchestration and Choreography, Hewlett-Packard Company, 2003.
Leslie Lamport: Specifying Systems, pp. 221-229, and 268-273.
Leslie Lamport: TLA in Pictures.
James Johnson, David Langworthy, Leslie Lamport and Fredrich Vogt: Formal Specification of a Web Services.
Emilia Cimpian, Mick Kerrigan: WSMX Process Mediation.
Dieter Fensel, Christoph Bussler, Alexander Maedche: Semantic Web Enabled Web Services.
Yuan Yul, Panagiotis Manolios, and Leslie Lamport: Model Checking TLA+ Specifications.
Michael Stollberg, Emilia Cimpian, Andrian Mocan, and Dieter Fensel: A Semantic Web Mediation Architecture.

(Continued)

*Primary Examiner* — Anna Deng
*Assistant Examiner* — Matthew Brophy
(74) *Attorney, Agent, or Firm* — Fountainhead Law Group PC

(57) ABSTRACT

In one embodiment the present invention includes a method of determining whether computer processes can interact without deadlocks. The computer processes may be modeled in a process modeling language. The method includes (optionally) generating state diagrams from the processes as modeled by process modeling language, generating step actions from the state diagrams, and executing model checking on the step actions. A computer program may implement the method, and a computer system may execute the computer program. Performing model checking on processes modeled by the process modeling language allows for increased interoperability checking.

22 Claims, 8 Drawing Sheets

OTHER PUBLICATIONS

Friedemann Lindemann: Service-Oriented Requirement Engineering and Verification. Chap. 6.4, pp. 52-69.
M. Pistsore, P. Traverso and P. Bertoli: Automated Composition of Web Services by Planning in Asynchronous Domains, 2005.
Marlon Dumas, Murray Spork, and Kenneth Wang: Adapt or Perish: Algebra and Visual Notation for Service Interface Adaptation.
(Edited by) Alexander Romanovsky: CaberNet Vision of Research and Technology Development in Distributed and Dependable Systems. Jan. 2004, pp. 62-69.
Official Journal EPO, pp. 592-593, Nov. 2007.
European Search Report (from a corresponding foreign application), EP 08 009 462.6, mailed Oct. 30, 2008.

* cited by examiner

```
<process name = "Process 1" ... >
...
    <invoke partnerLink="order"
      portType="orderPT"
      operation="requestOrder"
      inputVariable="someMessage"
    </invoke>
...
</process>
```

```
<process name = "Process 2" ... >
...
    <receive partnerLink="order"
      portType="orderPT"
      operation="requestOrder"
      variable="someMessage"
    </receive>
...
</process>
```

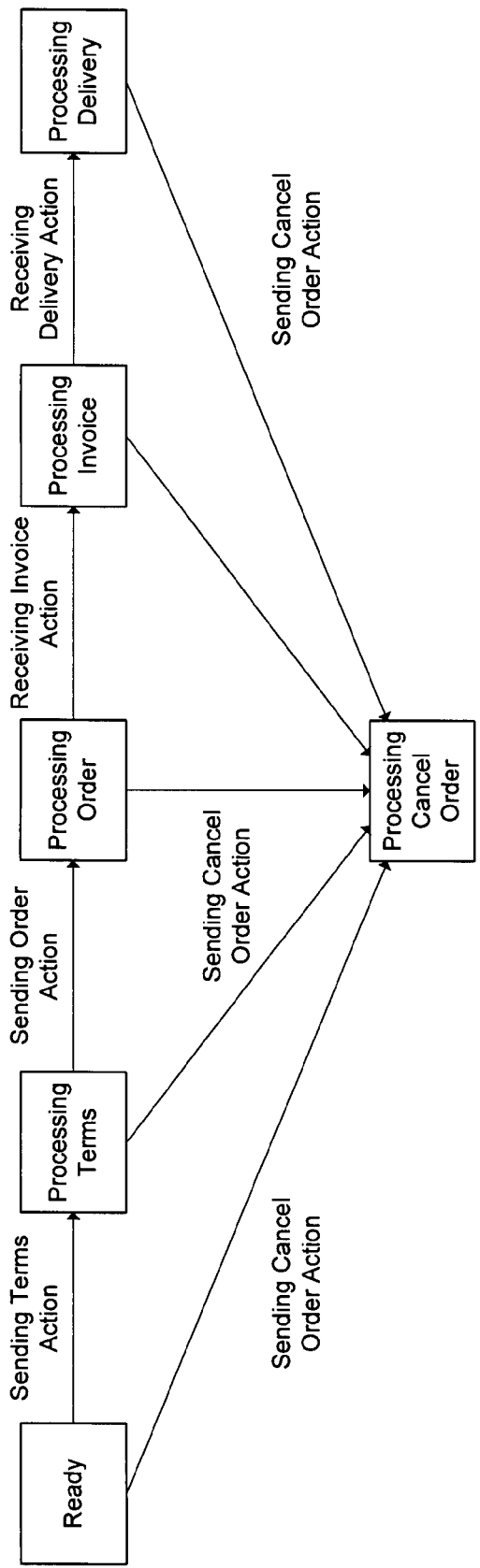

FIG. 8

```
Customer1_Receiving_Delivery_Action ==
    △ cState       = "Processing Invoice"
    △ cState'      = "Processing Delivery"
    △ cPrevStates' = { "ready",
                       "Processing Terms",
                       "Processing Order",
                       "Processing Invoice" }
    △ cMode        = 1
    △ cConditions' = {"bpws:getVariableData('Count') > 100"}
```

FIG. 9

```
Customer1_Sending_Order_Action ==
    LET    prvStSet    == {"ready"}
           paralStSet  == {"Processing Terms"}
    IN     △ mPrevStates ⊆ paralStSet ∪ prvStSet
           △ prvStSet    ⊆ mPrevStates
           △ mState'     = "Processing Order"
           △ mPrevStates'= mPrevStates ∪ { mState' }
           △ mMode'      = 0
```

FIG. 10

```
Next ==
        △  ∇  Customer1_Sending_Terms_Action
           ∇  Customer1_Sending_Order_Action
           ∇  Customer1_Receiving_Invoice_Action
           ∇  Customer1_Receiving_Delivery_Action
        △  ∇  Seller_Receiving_Terms_Action
           ∇  Seller_Receiving_Order_Action
           ∇  Seller_Sending_Invoice_Action
           ∇  Seller_Sending_Delivery_Action
        △  sameState sameState ==   △  cState' = sState'
               △  cMode' ≠ sMode'
               △  cState' ∈ cFinalStatesSet
               △  sState' ∈ sFinalStatesSet
```

FIG. 11

```
Init ==
        △  cState       = "ready"
        △  sState       = "ready"
        △  cPrevStates  = {"ready"}
        △  sPrevStates  = {"ready"}
        △  cConditions  = {}
        △  sConditions  = {}
        △  cMode        = 0
        △  sMode        = 0
```

FIG. 12

```
TypeInvariant ==
        △  cState ∈ cAllStatesSet
        △  sState ∈ sAllStatesSet
        △  cPrevStates ⊆ cAllStatesSet
        △  sPrevStates ⊆ sAllStatesSet
        △  cMode ∈ {0, 1}
        △  sMode ∈ {0, 1}
```

FIG. 13

```
Customer1_Sending_Cancel_Order_Event ==
    Δ  cState'          = "Processing Cancel Order"
    Δ  cPrevStates      ⊆ cAllStatesSet
    Δ  cPrevStates'     = cPrevStates ∪ { "Processing Cancel Order" }
    Δ  cScopeSeq'       = << "process" >>
    Δ  cMode'           = 0
```

Computer System 1600

SYSTEM AND METHOD OF AUTOMATIC INTEROPERABILITY CHECKING FOR BPEL

CROSS REFERENCE TO RELATED APPLICATIONS

Not applicable.

BACKGROUND

The present invention relates to the interaction between processes of different enterprises, and in particular, to checking whether processes from different enterprises can interact without deadlocking.

Unless otherwise indicated herein, the approaches described in this section are not prior art to the claims in this application and are not admitted to be prior art by inclusion in this section.

The Business Process Execution Language for Web Services (BPEL) has quickly evolved into a widely accepted industry standard for representing and executing business processes. Other than its ability to describe interactions and collaborations between web services on the level of one business process, BPEL also allows collaborations between many business processes, thereby performing choreography between web services which are part of the different business processes. A BPEL business process may be generally referred to as a process.

A process, described in BPEL, can include calls to and replies from other processes in the form of BPEL activities (e.g., invoke, reply, etc.). In one process, the sequence of these calls and replies occur in a predefined order, depending on the workflow described by the process's BPEL specification. For any two business processes to be able to interact successfully without reaching any deadlocks, each process must have a sequence of calls and replies which corresponds to the other process. Or, in other words, a full matching of the communication patterns between the sender and receiver is necessary for them to interact without deadlocks.

It is often the case that a single enterprise can design its processes such that its processes can interact without deadlocks. Even then, there might be some unexpected scenarios which might lead to interaction problems and deadlocks. Moreover, the vision of inter-enterprise integration is to have different enterprises providing their web services and processes for usage by other enterprises. However, interaction between processes of different enterprises is usually not possible due to mismatches in the interaction patterns, which would lead to deadlocks even in simple cases. Hence, these deadlocks represent a limitation for achieving wider interoperability.

Thus, there is a need for improved ways of determining whether processes can interact without deadlocking. The present invention solves these and other problems by providing an automatic tool for interoperability checking of BPEL processes.

SUMMARY

Embodiments of the present invention improve interoperability of computer processes. In one embodiment the present invention includes method of verifying that computer processes can interact without deadlocking. The method includes (optionally) generating state diagrams. The state diagrams correspond to the computer processes to be checked. The state diagrams include a plurality of states linked by a plurality of links. The method further includes generating a plurality of step actions from the plurality of links. The method further includes generating a next state formula as a conjunction of the step actions and a next state condition. The method further includes executing model checking on a process specification. The process specification includes the step actions and the next state formula. A result of the model checking indicates whether a deadlock occurs between the processes.

According to another embodiment of the present invention, a computer system executes a computer program that implements the method described above.

According to another embodiment of the present invention, a computer readable medium stores a computer program that implements the method described above.

The following detailed description and accompanying drawings provide a better understanding of the nature and advantages of the present invention.

BRIEF DESCRIPTION OF THE DRAWINGS

FIG. 8 illustrates an example of a state diagram for another process.

FIG. 9 illustrates an example of a step action according to an embodiment of the present invention.

FIG. 10 illustrates another example of a step action according to an embodiment of the present invention.

FIG. 11 illustrates an example of a Next state formula according to an embodiment of the present invention.

FIG. 12 illustrates an example of an initial state predicate according to an embodiment of the present invention.

FIG. 13 illustrates an example of a type invariance predicate according to an embodiment of the present invention.

DETAILED DESCRIPTION

Figure 1:
FIGS. 1-3 are diagrams that illustrate deadlocks.

Described herein are techniques for determining whether processes can interact without deadlocks. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Various methods and processes are described herein. Although the specific method steps may be described in a specific order, such description is mainly for ease of presentation. The method steps may be performed in other orders or in parallel. A particular method step need not wait for the completion of another step unless such is absolutely required, which either will be apparent from the description or will be specifically pointed out as a requirement for that particular step.

The terms "model", "process", "business process" and "computer process" are used. In general, the term "model" refers to an embodiment of the present invention, which may be implemented as software on a computer system. The terms "process", "business process" and "computer process" are intended to be used interchangeably. These terms describe the items that embodiments of the present invention use as inputs in order to achieve various results. Such processes may be computer programs that are implemented on a computer system. As such, the models and processes are not to be considered abstract business methods, but are concrete implementations of computer software on a computer hardware system.

One goal of certain embodiments of the present invention is to check whether processes can interact successfully without deadlocks. In order to describe a process and check whether it is able to interact with another one, a formal description of processes may be used. Temporal Logic of Actions (TLA) is a logic for specifying, reasoning about and verifying concurrent systems. TLA+ is a specification language based on TLA. In TLA, a specification is a logical formula describing all possible correct behaviors of the system. Describing processes in terms of TLA enables embodiments of the present invention to specify the properties of processes that we want to prove, namely, the absence of deadlocks during interaction. Having a TLA+ specification, embodiments of the present invention can model check this specification using a model checker and simulator of TLA+ specifications such as TLC.

In order to specify BPEL processes in TLA+, embodiments of the present invention translate BPEL activities into a TLA+ representation depending on the semantics of each BPEL activity. A process can be viewed as a sequence of states where, in order to reach a state, an enabling TLA+ step action is needed. Embodiments of the present invention model an interacting BPEL activity (e.g., an invoke activity) as a TLA+ step action that represents a transition from an old state to a new state. We can consider the resulting TLA+ specification to be equivalent to a state diagram with the states as nodes and the step actions as transitions. Having this state diagram-like representation of processes in terms of TLA+, embodiments of the present invention can examine whether a process is able to interact with another and what and where the problem lays by applying a model checker such as TLC.

Described below is how the previously mentioned translation can be achieved for the different BPEL primitives. In order to achieve this mapping, we analyze how the semantics of different BPEL primitives can be mapped to TLA+. Moreover, we identify many important mismatch patterns that might occur during the interaction between two processes, as these patterns serve as a first step of mediation. Additionally, we describe how to model check the resulting specifications, how to interpret the results, and how to make use of the results.

BPEL exists in more than one implementation. Embodiments of the present invention are applicable to BPEL in general. In the below description, for purposes of illustration, the features of the BPEL4WS 1.1 specification are used.

From the point of view of ability to be mediated, process interaction mismatches may be categorized into two categories, resolvable mismatches and irresolvable mismatches. The resolvable mismatches may have different patterns depending on whether the message exchange is synchronous or not, whether a process will send or receive a message, or whether a message is subclass or superclass of what is expected on the other side. (The term "message" refers to a single interaction, for example, a BPEL invoke, receive, reply, or onMessage interaction. The wording "subclass or superclass" relates to a situation where not only xml messages are sent between partners, but also instances of an ontology concept are sent. Messages containing instances of ontology entities may be handled by embodiments of the present invention in a manner similar to that described for messages in general.)

Certain embodiments of the present invention are directed toward handling some of the resolvable mismatches. Three types of resolvable mismatches are deadlocks caused by the inversed order of message calls, deadlocks caused by unacknowledged synchronous message calls, and deadlocks caused by unexpected messages. These three resolvable mismatches are discussed below with reference to FIGS. 1-3.

FIG. 1 is a diagram illustrating a deadlock caused by inversed order of message calls. An inversed message call describes a situation when the order of an interaction is different for two processes. In such a case, the calling process sends a message that is not expected, at that point, in the called process. For example, as shown in FIG. 1, activity "A" in "Process 2" could not be called from "Process 1", before "Process 2" has finished the previous required activity "B". However, activity "B" is called after activity "A" in "Process 1". The message exchange shown in FIG. 1 leads to a deadlock situation, and the two processes will not be able to interact.

By discovering a mismatch pattern like the one in shown in FIG. 1, embodiments of the present invention may resolve the resulting deadlock situation by a mediator. This mediator is an intermediate entity that swaps the order of messages received by the first process so that the order will map with that of the second process. For this purpose, the mediator first stores the messages received from the first process and forwards them later to the second process in the correct order. For the example shown in FIG. 1, a mediator will first store Message "A", which will be forwarded to the second process after message "B".

Figure 2:

FIG. 2 is a diagram illustrating a deadlock caused by unacknowledged synchronous message calls. An unacknowledged synchronous message call describes a situation when a process is waiting for another process to answer while the second won't answer because it just expects an input message from the calling process. For example, as shown in FIG. 2, a synchronous invoke activity, with input and output variables in "Process 1", calls an asynchronous receive activity in "Process 2", where "Process 2" doesn't have a corresponding answering reply activity. Therefore, "Process 1" will be waiting in a deadlock situation, which will also stop any further interactions between these two processes. To resolve this mismatch, a mediator according to an embodiment of the present invention may create a dummy acknowledgement to "Process 1".

Figure 3:

FIG. 3 is a diagram illustrating a deadlock caused by an unexpected message. An unexpected message describes a situation opposite to the situation described above with reference to FIG. 2. As shown in FIG. 3, "Process 1" with an asynchronous invoke activity makes a call to "Process 2" with the synchronous interaction pair of receive/reply activities. This reply from "Process 2" is not expected by "Process 1" and it can be silently ignored. However, this could cause inconsistency in the case that the result of this reply activity is significant in later steps of the process.

Given the above understanding of deadlock situations, we now proceed with a description of how embodiments of the present invention detect deadlock situations.

Figures 4, 5:
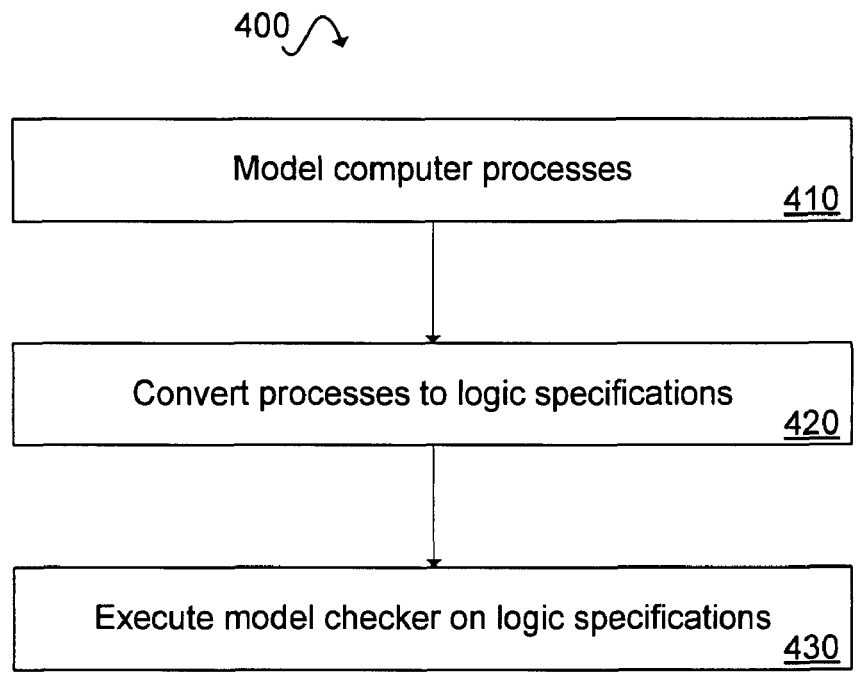
FIG. 4 is a flowchart of a method of detecting deadlocks according to an embodiment of the present invention.
FIG. 5 illustrates an example of two BPEL processes.

FIG. 4 is a flowchart of a method 400 of verifying that processes can interact without deadlocking. In step 410, the processes are modeled in business process modeling language such as BPEL. A process may be implemented in computer program written in a specific programming language. For example, a process may be implemented in the JAVA programming language from Sun Microsystems. In such case, the process is converted into a business process modeling language such as BPEL.

Alternatively, a process may be implemented in a business process modeling language (such as BPEL) directly. The computer system may compile or otherwise interpret the modeling language into another programming language, for example the JAVA programming language. In such a case, the process modeling language may be used directly in step 410.

In step 420, the modeled processes (for example, modeled in BPEL) are converted into a specification language for logically specifying and reasoning about concurrent and reactive systems. One such specification language suitable for embodiments of the present invention is TLA+. In step 430, a model checker such as TLC is executed on the specification language (for example, the TLA+ specifications) to detect deadlocks. The steps 420 and 430 are more fully detailed below.

As mentioned above, in step 420, the BPEL processes are translated into TLA+ specifications. It is important to mention that there is no one-to-one or uniform correspondence between BPEL activities and their TLA+ representation. Rather, the TLA+ specification is an abstraction from many details of the BPEL process. This abstraction captures the properties in which we are interested. According to embodiments of the present invention, one aspect is the basic communicating BPEL activities which result in message exchanges (e.g. invoke activity). Other aspects are other structured BPEL activities that contain any of the first mentioned activities. Some of the BPEL activities have no significance in certain embodiments of the present invention (for example, the assign activity) and therefore not represented in terms of TLA+. (This is also true for irrelevant interaction activities, i.e., such activities that have a partnerLink that is not of interest in the current check.)

As we mentioned, one goal of certain embodiments of the present invention is to check whether a pair of BPEL processes can interact successfully without deadlocks. To achieve that goal, certain embodiments of the present invention first translate these two processes into a TLA+ specification which can be model checked for deadlocks. Certain embodiments of the present invention may check for deadlocks for more than two processes in a manner similar to that described for checking two processes.

To identify the common message exchanges between a set of processes, embodiments of the present invention use the attribute information of a BPEL activity. Interaction activities (for example, the invoke activity) contain the following three attributes: "partnerLink", "portType" and "operation", which may be referred to as the interaction triple. This triple serves as the logical endpoint for an interaction activity. For one interaction between two business processes to occur, both will have to share the same triple, which can be regarded as an identifier for one interaction. (Note that physical endpoints may also play a role in BPEL/Web service environments. They specify the URL or the like under which a service invocation is accepted. E.g., an Expedia flight booking service might be reachable under the physical endpoint <http://www.expedia.com/services/flightBooking>.)

FIG. 5 illustrates an example of two BPEL processes. In FIG. 5, the invoke and receive activities represent a common interaction between the two processes, as these two activities share the same interaction triple.

A BPEL process can be seen as a sequence of states, where in order to reach a state, an enabling action is needed. If a process is more complex, these state sequences can grow in complexity to form a state diagram rather than a simple sequence. BPEL activities like invoke, receive, onMessage and reply represent the important interaction points and are modeled into a TLA+ step actions that define a transition from the old state to a new state. Other structured BPEL activities may be broken iteratively into their sub-activities. In addition to that, other intermediate states and paths in the state diagram may be identified when there is branching in the process (for example, flow, if, switch, pick and other activities). The TLA+ step actions forms, resulting from BPEL, describe the possible states and state transitions between the activities in a process.

Two processes are able to interact at some point if both have reached a state where they can perform this interaction. This state is a common state in which a partnerLink operation can be performed. To reach this state, both processes must complete all the necessary previous activities. Recall that a process can be described as a state diagram. This diagram represents one or more different possible execution paths which a process can have. For each path there is a predefined order of activities. For any two processes to interact without deadlocks, they must have a common path, where the sequence of activities is the same for both. An example of this is given below.

In many cases any of the two process, checked for deadlock, might also have interactions with other processes (that is, processes other than those two processes). In terms of BPEL, this means that they would have common partnerLinks with these processes with which they interact. Certain embodiments of the present invention may use the common partnerLinks (that is, the partnerLinks between our pair) and the interactions through these partnerLinks. These embodiments assume that all other interactions with any other processes (that is, processes other than the pair) are successful by ignoring them in the specification. According to other embodiments, all involved processes may be checked.

A TLA+ specification contains the definitions of all step actions with their conditions, required previous states, post states and the not required states which can occur before or after. This specification results from transforming the BPEL activities to the semantics of TLA+ and identifying all the possible paths that a process can have. Afterwards, this specification may be checked using a model checker such as TLC, which from its side, can tell us which interactions, from the sequence of all interactions, can occur and which not after evaluating all the possible states and transitions between the step actions of both processes.

Representing a BPEL process as a state diagram is an intermediate step in the translation from BPEL to TLA+. This state diagram represents a directed graph that describes all the possible execution paths in a process. For simple BPEL processes this could be a straightforward task, however this is not true when the process gets more complex. Embodiments of the present invention automatically generate such a diagram after reading a BPEL process. As we will see, there is a correspondence between how the state diagram is modeled and the resulting TLA+ specification. To get an understanding how such diagram can be generated from BPEL, we introduce the next example with simple BPEL primitives.

Figure 6:
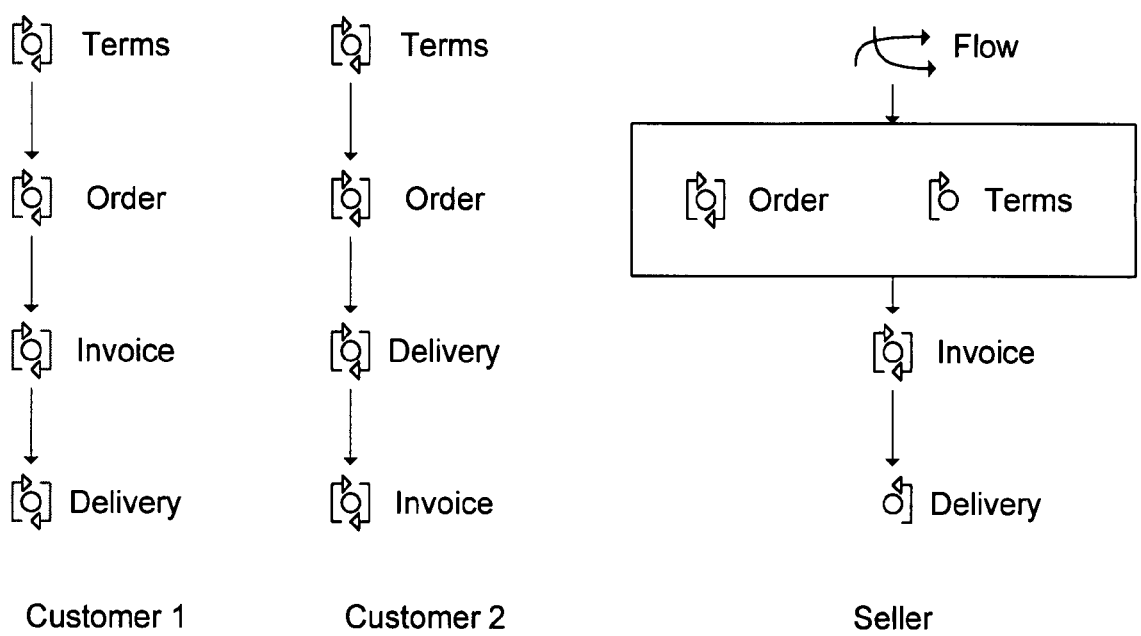
FIG. 6 illustrates an example of three business processes.

FIG. 6 illustrates three simple business processes: Customer1, Customer2 and Seller. These processes represent the execution order and sequences of business activities as seen by the given entity. The nodes represent BPEL activities and the arrows are used to show the sequence of activities.

In the case of the Seller, the process starts with a BPEL flow activity which contains two sub activities, namely: receiving an order and terms. As these sub activities run in parallel, their order of execution is not important, so any can be done first. After having finished both activities, the Seller sends an invoice and after that delivers some goods. For the other two customers, the flow of activities is represented as a sequence where Customer1 expects the invoice before the delivery, while Customer2 expects the delivery before the invoice.

If we take the first case of Customer1 interacting with the Seller, we will easily notice that they are able to interact successfully as the sequence of activities maps into what they both expect. However, when Customer2 and the Seller start interacting, they will reach a deadlock before reaching the end of their processes. This is because Customer2 expects the delivery before invoice, while the Seller can send the delivery only after it has sent the invoice.

Figure 7:
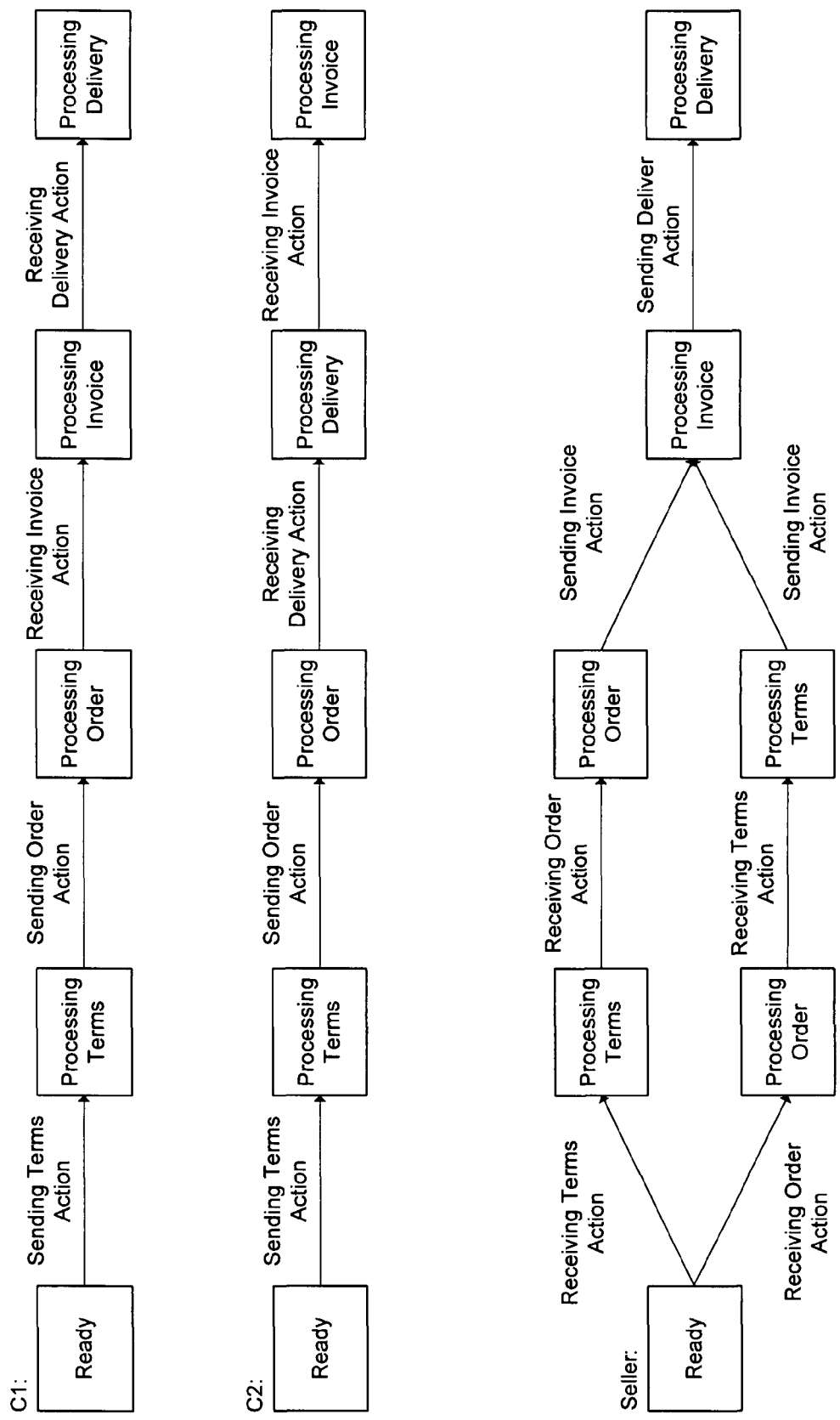
FIG. 7 illustrates an example of a state diagram that corresponds to the processes of FIG. 6.

FIG. 7 illustrates a state diagram of the processes shown in FIG. 6. (In this example, naming conventions of states and transitions are ignored.) In order to specify the processes shown in FIG. 6 in a formal way and to describe all the possible execution paths, embodiments of the present invention translate the processes into a state diagram. This state diagram is a directed graph with sequences of states and state transitions, as the ones shown in FIG. 7. As mentioned above, embodiments of the present invention regard each interaction between the two processes as a common state (for example, the common state "Processing Invoice"). Here, we notice that the Seller offers two different possible paths of state sequences. One of two paths is the same as the one of Customer1, thus, they will be able to reach their end states successfully. This of course doesn't apply for Customer2.

The example shown in FIG. 7 is an example of how to create a state diagram for simple processes. However, in the cases of more complex processes, activities like the invoke activity can be located deep in the tree structure of other structured activities. Moreover, activities like flow, if and others can result in different execution paths. Hence, translating business process activities into a state diagram is not a straightforward task.

To describe the behavior of a process formally, all its possible execution paths may be specified.

FIG. 8 shows an example of a state diagram for another process. In FIG. 8, consider that the additional activity CancelOrder can be sent any time from Customer I to the Seller. To represent this activity in the state diagram, embodiments of the present invention create a state transition from all the other states to a new state, e.g. "Processing Cancel Order", as shown in FIG. 8.

Notice that even though this example is simple, with the new "Sending Cancel Order" activity, we have introduced five new different execution paths. To reduce the size of such diagrams, event activities and other activities which may occur concurrently at any time can be excluded from the diagram, as in FIG. 7. In order to describe that the "Sending Cancel Order Action" (see FIG. 8) can occur anytime before or after the other actions in the same figure, embodiments of the present invention define a new set of parallel states. This set of parallel states is defined for each step action and contains actually the set of states which can be reached any time before or after the respective step action. For example, the "Receiving Invoice Action" (see FIG. 8) will contain the "Processing Cancel Order" state in this set, meaning that this state can be reached either before or after the "Receiving Invoice Action". This set of parallel actions, along with the different sequences of states, will describe the possible transitions of TLA+ step actions.

The aim of our TLA+ specification is to describe the safety properties which must be satisfied by the finite behavior of our specification. (Safety means what must not happen.) Safety in TLA+ means to restrict the behavior of a system by defining predicates and constrains and specifying what is incorrect. Since embodiments of the present invention model a process as states and state transitions, describing which transitions can happen and which not is sufficient for finding deadlocks, thus satisfying the safety properties.

The previously generated state diagram is the first step into translating BPEL into TLA+, as the links in this diagram represent the TLA+ step actions. Moreover, each link may specify its possible previous and next states, which includes: the interaction mode, the previous and next states, the set of all previous states which are necessary and which are not necessary to reach this state, the new set of states after running this step action, and any conditions. These elements are explained below.

FIG. 9 illustrates an example of what a step action in our TLA+ specification looks like according to an embodiment of the present invention. (Naming conventions can be ignored for now). We take the case of "Receiving Delivery Action" in the Customer1 process (see FIG. 7). This step action represents a conjunction of the previous state cState, next state cState', the set of previous necessary states cPrevStates', the interaction mode, and the conditions. Note that a primed state (') refers to the next state. For the interaction mode, 1 stands for input and 0 for output.

Note that the definition of cPrevStates can be skipped because cState, cState' and cPrevStates are sufficient to describe the set of necessary states. It is even sufficient to only use cPrevStates and cPrevStates'. However, later in our TLA+ specification we refer to the previous state, and that is why the variable cState is used in embodiments of the present invention.

The interaction mode of a step action is defined as a TLA+ variable and represents the direction of the message exchange. It can be either inwards or outwards depending on the BPEL activity. For the receive and onMessage activities it is inwards, and for the reply activity it is outwards. As for the invoke activity, the mode may be outwards in the case of an asynchronous invoke activity, or both outwards and inwards in the case of a synchronous invoke activity. To represent the interaction mode of the synchronous invoke activity in terms of embodiments of the present invention, we break it into an asynchronous invoke activity with an outwards mode and a receive activity with an inwards mode.

The set of all previous states which are necessary to reach the current step action is represented in TLA+ with a variable defining the set cPrevStates. This set is a subset of all the states that a process can have. The name of such a state that we use is derived from the interaction triple we described before (e.g., partnerLink_portType_operation). Therefore, the state's name would be the same for a common interaction between two processes. Other than the mentioned set of all previous states cPrevStates', the new set including the current state cPrevStates' is specified in this step action. This actually represents the new state of this set.

(We use simple names of the states in the examples for better readability. Moreover, we can equally define three separate variables for partnerLink, portType and operation instead of using one state variable as in the embodiment described above.)

As described above (see FIG. 8 and related text), we introduced the use of a set for all states which are not necessary for the current step action, which we called the set of parallel states. These states can occur before or after the given state transition. With the definition of this set, we have the ability to describe the concurrency of step actions.

If the execution of a step action depends on some certain conditions, they can be defined for that step action. These conditions are represented as a set of all conditions needed until this step action. A condition in this set can be any expression (for example, XPath expressions in certain embodiments of the present invention). A new condition will be added to the set whenever a conditional BPEL activity or a link with transition condition is reached. However, these conditions cannot be actually evaluated when the TLA+ specification is created. This is because these conditions are expressions which contain runtime variables where deadlock checking will be in stages before runtime.

FIG. 10 is an example of a step action showing concurrency with other step actions. In FIG. 10, the step action is redefined in a way so that it can handle concurrency with other step actions. The "Processing Terms" and "Processing Order" activities from the example shown in FIG. 9 can run concurrently, thus, order is not of importance. To describe this, as shown in FIG. 10, embodiments of the present invention define the paralStSet set, which contains the states on which the Order Action does not depend. With prvStSet we define the set of all necessary previous states. (With LET, we can define the sets inside the step action.)

For each of the links in the state diagrams (for example, FIG. 7 or FIG. 8), embodiments of the present invention defines a step action as described above with reference to FIGS. 9-10. Then, embodiments of the present invention define the Next state formula, which describes all the possible actions and transitions that can happen as a next step in the two combined business processes.

FIG. 11 illustrates an example of the Next state formula and the condition for the next state sameState. The prefixes (c and s) in the names of variables refer to the customer or seller process, respectively. The Next state formula is a conjunction of all the possible step actions of the first business process, the second business process, and a condition for each next step. Defining a TLA+ formula as a disjunction results in the concurrent execution of the step actions in this formula. Looking at the Next state formula, we notice that all the actions of Customer1 are in a disjunction, which means that any can happen in any order. The same applies to the Seller. The condition for the next step, sameState, ensures the correctness properties for each step action and checks whether the previous states for the first process are equal to the ones of the second, whether they have opposite interaction modes (so one process will be sending and the other receiving), and whether a possible last state was reached. The possible last state represents a set of all states which mark a successful end of the interaction. We define this set as a type invariant with the set of all possible common last states. We can consider the actual effect of sameState predicate as equal to checking whether the two processes have the same set of previous states.

Analyzing the Next formula depicted in FIG. 11, notice that each step action in the first process will be checked against all in the second. In this simple example, it is clear from the names that for example "Customer1_Sending_Terms_Action" has to be checked with "Seller_Receiving_Terms_Action". However, in the more realistic cases, the names of step actions will not tell us much, and in order to find which step actions share the same set of previous states (if any), they will have to be checked against all step actions in the second.

Having defined the step actions, the Next state formula and the condition checking predicate, our TLA+ specification contains other elements involved in embodiments of the present invention. These elements include the initial state predicate, the type invariance predicate, and the specification and theorem definitions.

FIG. 12 illustrates an example of the initial state predicate Init. The initial state predicate Init defines all the possible initial values of the variables in the specification. This is regarded as the first state in the specification.

FIG. 13 illustrates an example of the type invariance predicate TypeInvariant. The type invariance predicate TypeInvariant defines the types of the variables used in the specification that have to hold always true. This type invariance predicate may be asserted as a theorem at the end of the TLA+ specification. FIG. 13 describes the type correctness for all of the used variables.

Figures 14, 15, 16:
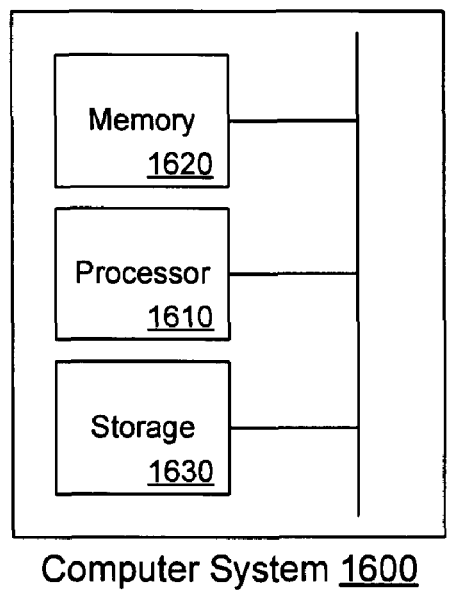
FIG. 14 illustrates an example of specification and theorem definitions according to an embodiment of the present invention.
FIG. 15 illustrates an example of an event handler step action according to an embodiment of the present invention.
FIG. 16 is a block diagram of a computer system according to an embodiment of the present invention.

FIG. 14 illustrates an example of the specification and theorem definitions. The full definition of the TLA+ specification Spec may have the form shown in FIG. 14, which represents the default TLA+ safety specification ignoring liveness. An example of the theorem implied from the specification is also shown in FIG. 14. A full TLA+ specification defines the used variables. In addition to the created variables, embodiments of the present invention may also define additional variables that may provide more details about the state of the step actions. Moreover, using TLA+ also provides embodiments of the present invention with the ability to print out the state of the defined variables.

Returning back to FIG. 4, in step 430, a model checker such as TLC is executed on the specification language (for example, the TLA+ specifications) to detect deadlocks. After having created the TLA+ specification of a process, embodiments of the present invention input the specification into a model checker (such as TLC). The model checker outputs a list of the interactions, in the form of states, that were successful between the two processes. These states represent a sequence of the interactions that both processes have reached. If one of the possible last states is reached (for each process), this means that no deadlocks were found. However, if no last state is reached, this means that a deadlock occurred. By itself TLC may not output other information; however, some embodiments of the present invention use print statements in the specification and use the defined specification variables to output some additional information on each interaction that succeeded or failed.

One important aspect of the value of the model checking of the specification according to embodiments of the present invention is to extract information about the successful and unsuccessful interactions. This information helps embodiments of the present invention to locate the problem, to find its cause, and to identify its interaction mismatch patterns, thus, providing further information for further purposes (e.g., mediation between the processes).

As discussed above, embodiments of the present invention are suited for use with BPEL. Further as discussed above, there is no one-to-one correspondence between a BPEL activity and an activity that can be checked with a model checker. One aspect of the present invention is the particular implementation of the automatic translation of BPEL activities into activities that can be checked with a model checker. Described below are more details about the specific implementation of BPEL translation performed by embodiments of the present invention.

Below are described which BPEL activities are of concern to the implementations of our model, how these activities are transformed into TLA+ representations, and how their semantics are captured. As mentioned above, some embodiments of the present invention are directed toward BPEL as described in the BPEL4WS 1.1 specification. Not all BPEL activities are of importance to all embodiments of the present invention. When translating a BPEL process into TLA+, we are mainly interested in activities resulting in interaction between two processes. The activities that are significant to the model can be categorized into five general types. First are interaction activities which are associated with a partner link operation. Second are the structured activities sequence and flow. Third are flow control activities which lead to branching. Fourth are scope related and handler activities. Fifth are other miscellaneous activities (such as throw and wait; empty is ignored). These are detailed below.

First, consider the interaction activities. In the case of simple activities, these include invoke, receive, reply, and OnMessage. There is no difference in the representation of these activities in TLA+ as they all are represented as step actions. However, there is an additional detail concerning the invoke activity. The invoke activity can declare its own fault and compensation handlers, which are semantically equivalent to having an enclosing scope with these handlers. Moreover, the onMessage activity encloses a child activity, as discussed in more detail below.

One significant difference between these activities is the direction of interaction or mode of transmission, which can be in or out. For this property to be specified, we define a variable mode for each step action. The mode of interaction will be checked for the interacting processes, so that when one activity from one side interacts with another on the other side, they would have to be with inverse mode values for this interaction to be successful.

The invoke activity, as mentioned before, may be asynchronous with an outwards transmission mode, and may be synchronous with an outwards or inwards transmission mode. As only one mode is possible for an activity, the synchronous invoke will be represented with two step actions with different modes. The receive and OnMessage activities may be represented in the same way and have an inwards transmission mode. The reply activity has an outwards mode.

An onMessage activity can be regarded as a simple receive activity, with the difference that onMessage encloses a sub-activity, which can be simple or structured. Handling onMessage itself is as in the receive activity and the onMessage activity will result in a TLA+ step action. The sub activity of onMessage can be handled as a consequent activity that is executed after the onMessage activity.

The onMessage activity can be part of a pick activity or an event handler. In the event handler case, onMessage can be called before or after any activity belonging to the same scope. (Scope is discussed in more detail below.)

Second, consider sequence and flow structured activities. These are activities which may contain more than one simple or other structured activity. The sequence and flow activities are not represented directly in TLA+ by embodiments of the present invention, rather, they are broken into the simple activities that they or their children contain. These both play a role in the creation of the state diagram with the paths, which is a step in the translation to TLA+. The sequence activity is the easier to represent in TLA+ from both, as its child activities will translate into a sequence of state transitions and states. The flow and pick activities are similar in that they lead to the creation of multiple paths in the state diagram.

Due to the flexibility in describing a flow activity in BPEL, it is much more complex than the sequence activity, as flows can be described in different ways. Often the flow activity would lead to the creation of multiple paths in the state diagram.

The flow activity in BPEL, on one hand, either describes activities which can be executed concurrently or, on the other hand, describes a complex structure with activities that build something like a graph. In the first case, the simple flow activity contains a set of activities with no links between the flow's child activities and no transition conditions in between. In the second case of the complex flow construct, transition conditions may be introduced and for each activity, source and/or target links may be defined. These links, which form edges between the activities, may be first defined in the flow before being used.

To translate a simple flow, as in the first case, into the semantics of TLA+, we can assume that the activities in the flow can be executed in any order. This means that such a flow can be represented as the permutations of its all first level child activities. The number of different possible combinations is the factorial of their count n. So for example, if we have 2 activities in a flow we will have 2! or 2*1=2 combinations, and if we have 4 activities we will have 4! or 4*3*2*1=24 combinations. This means that this particular flow activity will be replaced with n! paths with states and state transition. After finding all the permutations of the first level child activities of the flow, some of them can still be structured activities. In such a case, they are again broken into their child activities.

The complex flow structure, in the second case, represents a graph which introduces links and transition conditions between some or all of the child activities. The flexibility of BPEL in this case creates issues that are handled according to embodiments of the present invention. Introducing links to the complex flow structure, we have to pay attention to the semantics associated with the links. This involves synchronization dependencies between linked activities and under which conditions, transitions to a next activity can be done, in the case that an activity has dependency on more that one previous activity.

For example, if we take an activity C which is preceded by two activities A and B, depending on different factors we can identify three possible execution paths (assuming that the s suppressJoinFailure attribute is set to "no"):

For the first execution path, if no transition conditions are declared, both A and B will have to be executed before C because both links then will have a positive status.

For the second execution path, if a transition condition is available only on link A-C, this link can be either executed or not, however, the B-C link will always be executed. Therefore, we will have two possible execution paths in this case: links A-C and B-C both passed or only B-C passed.

For the third execution path, any link that is included in activity C as a join condition will have to precede activity C.

A further issue, when dealing with a complex flow, is that we have to handle links that may cross the boundaries of activities, referring to activities in other structured activities. As an example, an activity F in a sequence has a common link with an activity X outside the sequence. In such a case, if the link X-F has a transition condition, we can identify only one possible execution path, that is, activity X must be always executed before activity F.

The general idea behind the translation of a complex flow to TLA+ is to find, for each activity M in the flow, the set of previous activities that have to be executed before activity M, taking into consideration the synchronization dependencies issues. Such a set of previous activities, for each activity, has to be created before generating the TLA+ specification, where it will describe the set of previous states for a the corresponding TLA+ step action. Along with the set of previous states, for each step action, another set of activities for which there is no dependencies can be specified. This represents the set of activities that can concurrently be executed with a given step action.

Third, consider flow control activities. Flow control activities are these which lead to branching and introduction of new paths in the state diagram. These include the pick and switch/case (if in WSBPEL 2.0) activities.

The pick activity is similar to the flow activity in that it leads to the creation of multiple paths in the state diagram. The pick activity contains a set of onMessage activities of which only one can be executed. This would lead to replacing this pick activity with n new paths in our state diagram, where n is the number of onMessage activities. As the onMessage activity encloses a child activity, this child activity can be handled as a consequent activity which is placed after it. Other than the onMessage, the pick activity may also contain the onAlarm activity. This will not result in a TLA+ step action, however, it will be replaced by its child activity. In addition to that the deadline or duration expression specified by onAlarm may be regarded as a condition and may be handled like the switch/case activity.

The switch/case activity may be replaced by its child activities including the cases and otherwise clauses (in the case of if structure, this structure will be replaced by if, else and the set of else if clauses). This leads to the creation of as many new paths as the count of the branches. For each path, an incremental set of conditions is defined, which is increased by a new condition for each new met branch in the execution of a process. Transition conditions are handled in the same way as the switch/case activity.

The while activity is similar to the switch/case activity, thus we can easily describe one cycle exactly as the switch/case activity. One issue is with describing the infinite behavior of while in TLA+. A TLC model checker is limited to checking finite behavior of systems, as the outcome of such a checking is again a finite number of resulting successful states. By itself, a while loop can be regarded as deadlock until some condition is not true. To model such an activity in TLA+, we consider the choice to be either representing it as the switch/case activity or limiting the number of loops.

Fourth, consider scope related and handler activities. These activities include scope or a scope-like activity, fault handlers, compensation handlers, and message handlers, and may be described in TLA+ as detailed below according to certain embodiments of the present invention.

We start with the scope activity, which may not be of importance for interaction by itself. However, a scope activity is important for defining the scope of the handlers and the order in which they are called. The scope of activities will be used to call the right handler. A scope activity will be replaced by its child activity (similarly to what is done in a BPEL sequence), which is often a structured activity.

To capture the semantics of scopes and the dependent on them handlers in TLA+, we describe the scope level or depth using a TLA+ sequence (equivalent to lists in Java), where each entered scope is added to the sequence. This sequence will be added for each step action in the TLA+ specification. Handlers, on their side, will also have a defined sequence of scopes. Knowing which set of activities are in a scope, a handler can be called in parallel with an activity, with the same depth of scopes (except for compensation handlers as detailed below). If no handler is found with the same scope sequence elements, then the parent's scope is searched for handlers.

Once we have identified the sets of activities in the different scopes and once we have defined the scope sequence for all handlers and all step actions, handlers may be dealt with in a similar manner as the other BPEL activities. Handlers are wrappers to simple or structured activities which on their side are again handled as described in the previous subsections. The main difference is that handlers and respectively their sub activities can be called concurrently before or after other activities of a specific scope.

In BPEL, there are three types of handlers: event handlers, fault handlers, and compensation handlers. The simplest to model in terms of TLA+ are event handlers, which can enclose onMessage and/or onAlarm activities. The enclosed onMessage or onAlarm activities may themselves be handled in the same way as previously described. However, in the context of event handlers, the onMessage and onAlarm activities can occur any time in parallel with the activities of the same scope. The upper example specifies an error handler that can cancel an order in any time. It can, therefore, occur before or after any step action with an equal scope sequence.

FIG. 15 illustrates an example of an event handler step action. Recall the previous example in FIG. 7, where Customer1 can cancel the order at any time. To handle the event sent by Customer1, on the Seller's side there would be another event handler "Receiving Cancel Order" which is able to receive the customer's cancellation. To describe the previous handlers in Customer1 and the Seller in terms of TLA+, embodiments of the present invention define a step action for both as shown in FIG. 15.

In FIG. 15, for Customer1, we define the step action for sending the order cancellation. This step action can happen before or after any of the other step actions defined for Customer1. Therefore, we define the set of previous states cPrevStates, which are needed for the cancellation step action, to be any subset or equaling set ($\subseteq$) of all states set cAllStatesSet in Customer1. By the scope sequence cScopeSeq we can restrict the step actions that can be concurrent with the cancellation step action to those which have the scope sequence <<"process">>. However, in this example we only have one main scope that is of the process, which is defined for all the step actions in Customer1. That's why the cancellation step action can be concurrent with all other step actions.

The step action for receiving the order cancellation on the Seller's side will be similar to that in Customer1. However, the significant difference will be the interaction mode which will be inbound in the Seller's case.

The ability of embodiments of the present invention to specify fault and compensation handlers may be to some extent limited. This is because these handlers are mostly thrown by faults that occur at runtime and on a data level which may not be specified as variables in TLA+. It is not possible to know on a level of BPEL from where a fault was thrown without looking into the related WSDL file(s). Once we know the locations in a process where an error can be generated, it is then possible to describe that behavior in terms of TLA+.

Although it is difficult to capture all the cases of fault and compensation handlers, there are cases that may be addressed by embodiments of the present invention. Some of the faults thrown in BPEL are generated on a WSDL (web service) level. However, some other faults may be explicitly thrown within BPEL using the throw activity. For these faults, it is possible to locate where such faults were thrown. Embodiments of the present invention may consider throwing and capturing a fault as new possible execution path. This is because the last activity which was executed before the throw activity will be followed by the execution of the first activity in the fault handler.

The throw activity is the last activity to be executed in the scope where the fault was thrown. If this thrown fault is caught by a corresponding fault handler in this scope, new TLA+ step actions may be created for the sub-activities of the fault handler in a similar way to structured BPEL activities. Once the step actions in the called fault handler are executed, the next step action to be executed is the first one from the parent scope. The previous scenario describes how a fault will be handled if a fault handler is found. However, if no fault handler is found, implicit fault handling may be undertaken. If a fault reaches the process scope, this can be considered as a final state of the process. However, in case this fault is caught, then the step actions of the catching fault handler will be executed before terminating the process.

Fifth, consider other activities. These other activities represent less important activities, some of which embodiments of the present invention model in TLA+ while others not, for reasons that we describe in this subsection.

The terminate activity puts an end to a process. Therefore, it can be represented as a TLA+ step action which leads to a final state of a process. No other step action can be reached after executing a terminating step action.

The wait and empty activities can be ignored, as they are neither of significance for interaction nor contain any other interaction activities. The assign activity is ignored for the same reasons as the wait and empty activities; moreover, it handles data and messages that cannot be checked outside of runtime.

The method 400 may be performed by a computer program. BPEL is an XML language that specifies processes on the web service level, and may be implemented with any programming language. (BPEL may also be executed directly by a BPEL execution engine that may be implemented with any programming language.) Embodiments of the present invention parse the XML and execute it according to the specification. According to one embodiment, the state diagrams are generated by a JAVA program. Other programming languages may be used in other embodiments. TLA+ is a computer language to write expressions in TLA logic. The TLA+ expressions may be model checked by a TLA model checker, which may be implemented in any programming language. According to one embodiment, the model checker TLC may be implemented in the JAVA programming language.

FIG. 16 is a block diagram of a computer system 1600 that may be used to implement the method 400. The computer system 1600 includes a processor 1610, a memory 1620, and a storage device 1630. The processor 1610 performs standard functions of a computer processor, and executes processing which includes a computer program that implements the method 400. The memory 1620 performs standard functions of a computer memory, and works with the processor 1610 and the storage device 1630 to store and execute the computer program (and related data) that implements the method 400. The storage device 1630 performs the standard functions of a computer hard drive, and works with the processor 1610 and the memory 1620 to store the computer program (and related data) that implements 3the method 400. The computer system 1600 may include other components (not shown), such as a display or other output device, a keyboard or other user input device, a network connection or other communications interface, a removable media device, etc.

According to one embodiment of the present invention, the computer system 1600 is a laptop computer with a processor running at approximately 1000 MHz, RAM of between 500 MB and 1000 MB, a hard drive of approximately 60 GB, and running the Windows XP operating system. However, the JAVA-based implementation of certain embodiments of the present invention may run on any machine or operating system that implements a JAVA virtual machine.

Figure 17:
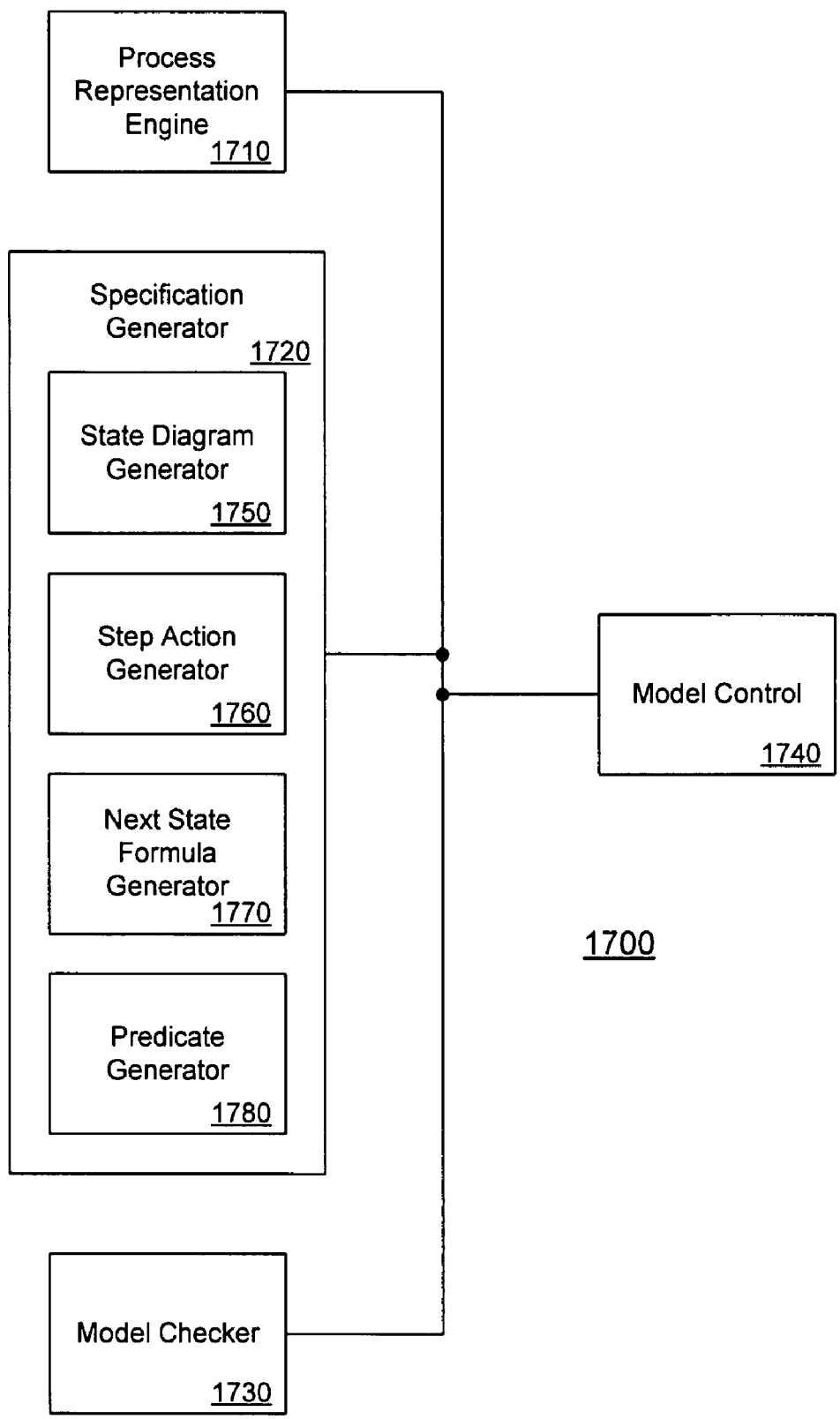
FIG. 17 is a block diagram of a computer program according to an embodiment of the present invention.

FIG. 17 is block diagram of a computer program 1700 that implements an embodiment of the present invention. The computer program 1700 may be implemented on the computer system 1600. The computer program 1700 may be embodied on a computer readable medium such as a computer RAM, a floppy disk, a CD-ROM, a DVD-ROM, a hard drive (such as the storage device 1630), a Flash memory, a data signal transmitted over a computer network, etc. The computer program 1700 may implement the method 400. The computer program 1700 includes a process representation engine 1710, a specification generator 1720, a model checker 1730, and a model control 1740.

The process representation engine 1710 processes programming that represents the processes to be checked for deadlocks. The process representation engine 1710 may include a user interface segment that the user uses to input or otherwise create the process representations, and an execution segment that executes the process representations. According to one embodiment of the present invention, these processes are represented as BPEL processes. The process representation engine 1710 is optional in that the computer program 1700 need not itself include the capability to generate or execute the representations of the processes at issue. The minimum requirement for the computer program 1700 is to be able to read a process that has been represented (for example, a process that has been described in BPEL). However, if a particular embodiment (for example, the computer system 1600) already includes a process representation engine, then the computer program 1700 may interface with the existing process representation engine in order to input the process representations of the processes to be checked for deadlocks.

The specification generator 1720 generates a specification for the processes to be checked for deadlocks. According to one embodiment of the present invention, the specifications are generated in TLA+. The specification generator 1720 includes a state diagram generator 1750, a step action generator 1760, a next state formula generator 1770, and a predicate generator 1780. The process for generating the specifications is as described above with reference to step 420, with the various generators in the specification generator 1720 performing various functions. The state diagram generator 1750 generates the state diagrams and the links from the process specifications. The step action generator 1760 generates the step actions from the links. The next state formula generator 1770 generates the next state formula as a conjunction of the step actions and the condition. The predicate generator 1780 generates the other predicates used to generate the specification, such as the initial state predicate and the type invariance predicate.

The model checker 1730 performs model checking on the specification generated by the specification generator 1720. According to one embodiment of the present invention, the model checker 1730 may be TLC. As a result of model checking, the model checker 1730 outputs whether the processes at issue can interact without deadlocks.

The model control 1740 interfaces between and coordinates the operation of the process representation engine 1710, the specification generator 1720, and the model checker 1730. The model control 1740 may include user interface functionality.

Embodiments of the present invention have a number of advantages. One such advantage is information security between enterprises. If a first enterprise wants to see if its process can interact with the process of a second enterprise, the second enterprise need not provide the first enterprise with the full source code that implements the second enterprise's process. The second enterprise need only provide a process specification (for example, a BPEL specification of the process) to the first enterprise. The process specification need only contain the details about interactions between processes, and can omit the specific implementation details that may contain proprietary information or other internal information of the second enterprise. In this manner, the information security of the second enterprise is preserved. As such, the second enterprise may be more willing to exchange process specifications, which will in turn allow the increase of interoperability of processes among separate enterprises.

Another such advantage is automation of interoperability checking. Many existing ways of interoperability checking use manual or trial-and-error interoperability checking, which is time consuming and susceptible to additional errors. Manual testing executes single execution trails. In terms of our state diagrams, a manual test run would check a single path through a diagram, whereas a feature of certain embodiments of the present invention involves checking all paths automatically. Testing all paths is simply not feasible with manual testing. Automation of interoperability checking helps to eliminate any time delays or intermediate errors from the checking process, since the automated interoperability checking tools of embodiments of the present invention may be fully tested prior to being used.

Still another such advantage is helping the user to understand where interoperability problems are occurring. Many existing ways of interoperability checking use trial-and-error interoperability checking. Embodiments of the present invention enable the user to insert print statements (see above regarding step 430) at various points to see the various points to which a set of processes have progressed before a deadlock occurs. Thus, the user is able to more quickly understand where the problems are occurring.

The above description has focused on the interaction between two processes, which describes the most general case. The principles of embodiments of the present invention are not limited to two processes, but may be applied to the interaction between more than two processes. For example, for three processes, the state diagrams for all three processes may be generated together, and model checking may be executed once.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of verifying that computer processes can interact without deadlocking, said method comprising the steps of:
    modeling a first process and a second process using a business process execution language for web services (BPEL);
    providing a first state diagram and a second state diagram, wherein said first state diagram corresponds to the first process and said second state diagram corresponds to the second process, wherein said first state diagram includes a first plurality of states linked by a first plurality of links, and wherein said second state diagram includes a second plurality of states linked by a second plurality of links;
    generating, by a computer system, a first plurality of step actions modeled in a temporal logic of actions specification language (TLA+) and a second plurality of step actions modeled in the temporal logic of actions specification language (TLA+), wherein said first plurality of step actions corresponds to said first plurality of links, and wherein said second plurality of step actions corresponds to said second plurality of links;
    generating, by the computer system, a next state formula as a conjunction of said first plurality of step actions, said second plurality of step actions, and a next state condition; and
    executing, by the computer system, model checking on a process specification, wherein said process specification includes said first plurality of step actions, said second plurality of step actions, and said next state formula,
    wherein a result of said step of executing indicates whether a deadlock occurs between said first process and said second process using a sequence of interactions that were successful between said first process and said second process, wherein said deadlock is indicated if said sequence of interactions fails to reach a last state of at least one of said first process and said second process.

2. The method of claim 1, further comprising:
    generating said first state diagram and said second state diagram, prior to said step of providing.

3. The method of claim 1, wherein a step action of said plurality of step actions represents a conjunction of a previous state, a next state, a set of previous necessary states, an interaction mode, and a step action condition.

4. The method of claim 1, further comprising:
    generating an initial state predicate, wherein said process specification further includes said initial state predicate.

5. The method of claim 1, further comprising:
    generating a specification definition, wherein said process specification further includes said specification definition.

6. The method of claim 1, wherein a step action of said first plurality of step actions includes an interaction activity.

7. The method of claim 1, wherein a step action of said first plurality of step actions includes a sequence activity.

8. The method of claim 1, wherein a step action of said first plurality of step actions includes a flow activity.

9. The method of claim 1, wherein a step action of said first plurality of step actions includes a flow control activity.

10. The method of claim 1, wherein a step action of said first plurality of step actions includes a scope activity.

11. A computer system including a computer program for verifying that computer processes can interact without deadlocking, said computer program comprising:
    a specification generator that models a first process and a second process using a business process execution language for web services (BPEL) and that generates a first plurality of step actions modeled in a temporal logic of actions specification language (TLA+) based on a first state diagram, a second plurality of step actions modeled in the temporal logic of actions specification language (TLA+) based on a second state diagram, and a next state formula, wherein:

said first state diagram corresponds to the first process and said second state diagram corresponds to the second process, said first state diagram includes a first plurality of states linked by a first plurality of links, and said second state diagram includes a second plurality of states linked by a second plurality of links, said first plurality of step actions corresponds to said first plurality of links, and said second plurality of step actions corresponds to said second plurality of links, and said next state formula corresponds to a conjunction of said first plurality of step actions, said second plurality of step actions, and a condition; and a model checker that executes model checking on a process specification, wherein said process specification includes said first plurality of step actions, said second plurality of step actions, and said next state formula, wherein a result of model checking indicates whether a deadlock occurs between said first process and said second process using a sequence of interactions that were successful between said first process and said second process, wherein said deadlock is indicated if said sequence of interactions fails to reach a last state of at least one of said first process and said second process.

12. The computer system of claim 11, wherein said specification generator comprises:
a step action generator that generates said first plurality of step actions and said second plurality of step actions;
a next state formula generator that generates said next state formula; and
a predicate generator.

13. The computer system of claim 11, wherein said specification generator comprises:
a state diagram generator that generates said first state diagram and said second state diagram.

14. The computer system of claim 11, further comprising:
a process representation engine that generates a first process representation of said first process and a second process representation of said second process, wherein said specification generator generates said first state diagram from said first process representation and said second state diagram from said second process representation.

15. A non-transitory computer readable medium embodying a computer program for verifying that computer processes can interact without deadlocking, said computer program comprising:
a specification generator that controls a computer system to model a first process and a second process using a business process execution language for web services (BPEL) and that controls the computer system to generate a first plurality of step actions modeled in a temporal logic of actions specification language (TLA+) based on a first state diagram, a second plurality of step actions modeled in the temporal logic of actions specification language (TLA+) based on a second state diagram, and a next state formula, wherein:

said first state diagram corresponds to the first process and said second state diagram corresponds to the second process, said first state diagram includes a first plurality of states linked by a first plurality of links, and said second state diagram includes a second plurality of states linked by a second plurality of links, said first plurality of step actions corresponds to said first plurality of links, and said second plurality of step actions corresponds to said second plurality of links, and said next state formula corresponds to a conjunction of said first plurality of step actions, said second plurality of step actions, and a condition; and a model checker that controls the computer system to execute model checking on a process specification, wherein said process specification includes said first plurality of step actions, said second plurality of step actions, and said next state formula, wherein a result of model checking indicates whether a deadlock occurs between said first process and said second process using a sequence of interactions that were successful between said first process and said second process, wherein said deadlock is indicated if said sequence of interactions fails to reach a last state of at least one of said first process and said second process.

16. The non-transitory computer readable medium of claim 15, wherein said specification generator comprises:
a step action generator that generates said first plurality of step actions and said second plurality of step actions;
a next state formula generator that generates said next state formula; and
a predicate generator.

17. The non-transitory computer readable medium of claim 15, wherein said specification generator comprises:
a state diagram generator that generates said first state diagram and said second state diagram.

18. The non-transitory computer readable medium of claim 15, further comprising:
a process representation engine that generates a first process representation of said first process and a second process representation of said second process, wherein said specification generator generates said first state diagram from said first process representation and said second state diagram from said second process representation.

19. The method of claim 1, wherein generating the first plurality of step actions translates the first process modeled using BPEL via the first state diagram into the first plurality of step actions modeled in the temporal logic of actions specification language (TLA+).

20. The method of claim 1, further comprising:
identifying a message exchange between the first process and the second process using attribute information of a BPEL activity; and
modeling the message exchange as a step action in the temporal logic of actions specification language (TLA+) that defines a transition from an old state to a new state.

21. The computer system of claim 11, wherein generating the first plurality of step actions translates the first process modeled using BPEL via the first state diagram into the first plurality of step actions modeled in the temporal logic of actions specification language (TLA+).

22. The computer system of claim 11, wherein the specification generator further configured to control the computer system:
to identify a message exchange between the first process and the second process using attribute information of a BPEL activity; and
to model the message exchange as a step action in the temporal logic of actions specification language (TLA+) that defines a transition from an old state to a new state.

* * * * *